(12) United States Patent
Koeske et al.

(10) Patent No.: US 8,807,576 B2
(45) Date of Patent: Aug. 19, 2014

(54) GAS SPRING PISTON ASSEMBLY AS WELL AS GAS SPRING ASSEMBLY AND SUSPENSION SYSTEM INCLUDING SAME

(75) Inventors: Paul P. Koeske, Fishers, IN (US); Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/980,742

(22) PCT Filed: Jan. 19, 2012

(86) PCT No.: PCT/US2012/021927
§ 371 (c)(1),
(2), (4) Date: Jul. 19, 2013

(87) PCT Pub. No.: WO2012/100098
PCT Pub. Date: Jul. 26, 2012

(65) Prior Publication Data
US 2013/0300074 A1    Nov. 14, 2013

Related U.S. Application Data

(60) Provisional application No. 61/434,277, filed on Jan. 19, 2011.

(51) Int. Cl.
| | | |
|---|---|---|
| *B60G 11/27* | (2006.01) | |
| *B60G 17/052* | (2006.01) | |
| *F16F 9/05* | (2006.01) | |

(52) U.S. Cl.
CPC ............ *B60G 11/27* (2013.01); *B60G 17/0525* (2013.01); *B60G 17/0528* (2013.01); *B60G 17/0521* (2013.01); *F16F 9/05* (2013.01); *B60G 2202/152* (2013.01); *B60G 2300/60* (2013.01); *B60G 2400/51222* (2013.01)

USPC .................................. 280/6.157; 280/124.167

(58) Field of Classification Search
CPC ............... B60G 11/27; B60G 17/0525; B60G 17/0528; B60G 17/0521; B60G 2202/152; B60G 2300/60; B60G 2400/51222; F16F 9/05; F16F 9/0236
USPC ........................... 280/6.157, 124.15, 124.167
See application file for complete search history.

(56) References Cited

U.S. PATENT DOCUMENTS

| | | |
|---|---|---|
| 3,507,580 A | 4/1970 | Howard et al. |
| 3,880,446 A | 4/1975 | Muller |

(Continued)

FOREIGN PATENT DOCUMENTS

| | | |
|---|---|---|
| CH | 357 637 A | 10/1961 |
| DE | 10 2007 032225 A1 | 1/2009 |
| EP | 2 243 644 A1 | 10/2010 |

OTHER PUBLICATIONS

International Search Report.

*Primary Examiner* — Drew Brown
(74) *Attorney, Agent, or Firm* — Jason A. Houser; Fay Sharpe LLP (57) ABSTRACT

A gas spring piston and compressive bladder assembly includes a gas spring piston (220) and a compressive bladder (222). The gas spring piston (220) includes an outer side wall. The compressible bladder (222) extends at least partially around the gas spring piston (220) and at least partially defines a bladder chamber (250). The compressible bladder (222) can be compressively engaged by an associated flexible (206) wall such that the compressible bladder (222) can generate a first pressure level within a quantity of gas within the bladder chamber (250). A gas spring assembly and a suspension system are also included.

20 Claims, 5 Drawing Sheets

(56) References Cited

U.S. PATENT DOCUMENTS

| | | | |
|---|---|---|---|
| 7,156,382 B2* | 1/2007 | Lloyd | 267/64.28 |
| 7,188,827 B2* | 3/2007 | Thomae et al. | 267/64.21 |
| 8,172,237 B2* | 5/2012 | Peterson | 280/5.515 |
| 8,272,627 B2* | 9/2012 | Oldenettel et al. | 267/122 |

* cited by examiner

GAS SPRING PISTON ASSEMBLY AS WELL AS GAS SPRING ASSEMBLY AND SUSPENSION SYSTEM INCLUDING SAME

BACKGROUND

The subject matter of the present disclosure broadly relates to the art of gas spring devices and, more particularly, to a gas spring piston and pump assembly that includes a gas spring piston as well as a flexible bladder that is operatively disposed along the gas spring piston and can operate to pump or otherwise displace pressurized gas therein in response to jounce actions acting on the assembly. A gas spring assembly including such a gas spring piston and pump assembly is also disclosed. Additionally, a suspension system including a plurality of such gas spring assemblies is included.

The subject matter of the present disclosure may find particular application and use in conjunction with suspension systems of wheeled vehicles, and may be described herein with specific reference thereto. However, it is to be appreciated that the subject matter of the present disclosure is also amenable to use in a wide variety of other applications and environments, and that the specific uses shown and described herein are merely exemplary. For example, the subject matter of the present disclosure could be used in connection with gas springs associated with support structures, height adjusting systems and/or actuators associated with industrial machinery, components thereof and/or other such equipment.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Additionally, gas suspension systems, such as for use on vehicles, for example, are known to provide the capability of adjusting the height and/or alignment (e.g., leveling) of a sprung mass (e.g., a body or chassis of a vehicle) relative to an unsprung mass thereof (e.g., a wheel-engaging member or axle housing of the vehicle). As such, known gas suspension systems commonly transfer pressurized gas into and out of gas spring assemblies that are operatively connected between the sprung and unsprung masses. In this manner, the gas suspension system can alter or otherwise adjust the height and/or alignment of the sprung mass relative to the unsprung mass.

In conventional suspension systems, pressurized gas is routinely transferred out of one or more gas spring assemblies to thereby reduce the height of the same and achieve a desired leveling or height adjustment action, such as for leveling (i.e., adjusting the height of one portion of a vehicle body or chassis relative to another portion) or lowering a vehicle body or chassis, for example. Normally, the pressurized gas that is transferred out of the one or more gas spring assemblies is simply discharged into the external atmosphere, such as the ambient atmosphere surrounding the vehicle, for example. Recognizing that ambient atmospheric pressure is within a range of from approximately 12 psi to approximately 15 psi, depending upon elevation and other factors, the discharge of a quantity of gas having a pressure of approximately 60 psi or greater into the external atmosphere represents an uncontrolled release or loss of potential energy. From the perspective of efficiency and energy conservation, such regular and ongoing releases of stored energy may be deemed undesirable.

Additionally, in conventional suspension systems, air is regularly drawn in from the external atmosphere and compressed, such as by using an electrically operated compressor, for example, to a desired pressure level. This pressurized air can then be transferred into one or more gas spring assemblies, such as to increase the height of the same, or can be stored in a suitable reservoir or tank for use at a later time. In addition to the undesirable nature of wasting potential energy by simply discharging pressurized gas into an external atmosphere, such as has been described above, the aforementioned process of generating pressurized gas for use in the gas spring assemblies (i.e., by taking in and subsequently pressurizing gas at nominal atmospheric pressure), can result in significant energy consumption associated with the generation of pressurized gas.

In view of the foregoing, it is believed desirable to develop a gas spring piston and pump assembly, as well as a gas spring assembly and suspension system including the same, that are capable of assisting in the generation of pressurized gas and/or otherwise providing improved performance of gas suspension systems.

BRIEF SUMMARY

One example of a gas spring piston and compressive bladder assembly in accordance with the subject matter of the present disclosure and dimensioned for use with an associated flexible wall can include a gas spring piston extending longitudinally between opposing first and second piston ends. The gas spring piston can include an outer side wall extending longitudinally from along the first piston end toward the second piston end. The first end can be dimensioned to receivingly engage an associated end of the associated flexible wall. A compressible bladder can extend at least partially around the gas spring piston and can at least partially define a bladder chamber. The compressible bladder can be disposed along the gas spring piston in spaced relation to the first piston end in a direction toward the second piston end such that at least a portion of the associated flexible wall can compressively engage the compressible bladder and generate a first pressure level of a quantity of gas within the bladder chamber.

One example of a gas spring assembly in accordance with the subject matter of the present disclosure can include a first flexible wall extending peripherally about a longitudinal axis and between a first end and a second end spaced longitudinally from the first end. An end member can be secured across the first end of the first flexible wall and can form a substantially fluid-tight seal therewith. A gas spring piston can extend longitudinally between opposing first and second piston ends. The gas spring piston can include an outer side wall extending longitudinally from along the first piston end toward the second piston end. The second end of the first flexible wall can be secured across the first piston end of the gas spring piston and can form a substantially fluid-tight seal therewith such that a spring chamber is at least partially defined by the first flexible wall between the end member and the gas spring piston and such that a rolling lobe is formed by the first flexible wall along the outer side wall of the gas spring piston. A compressible bladder can include a second flexible wall extending at least partially around the gas spring piston and at least partially defining a bladder chamber that is fluidically isolated from the spring chamber. The second flexible wall can be disposed along the gas spring piston in spaced relation to the first piston end in a direction toward the second piston end such that under a compressed condition of the gas spring assembly at least a portion of the first flexible wall can compressively engage the second flexible wall and can generate a first pressure level of a quantity of gas within the bladder chamber.

One example of a suspension system in accordance with the subject matter of the present disclosure can include a pressurized gas source, at least one gas spring assembly as described in the foregoing paragraph, and a valve assembly fluidically connected between the pressurized gas source and the at least one gas spring assembly.

DETAILED DESCRIPTION

Figure 1:
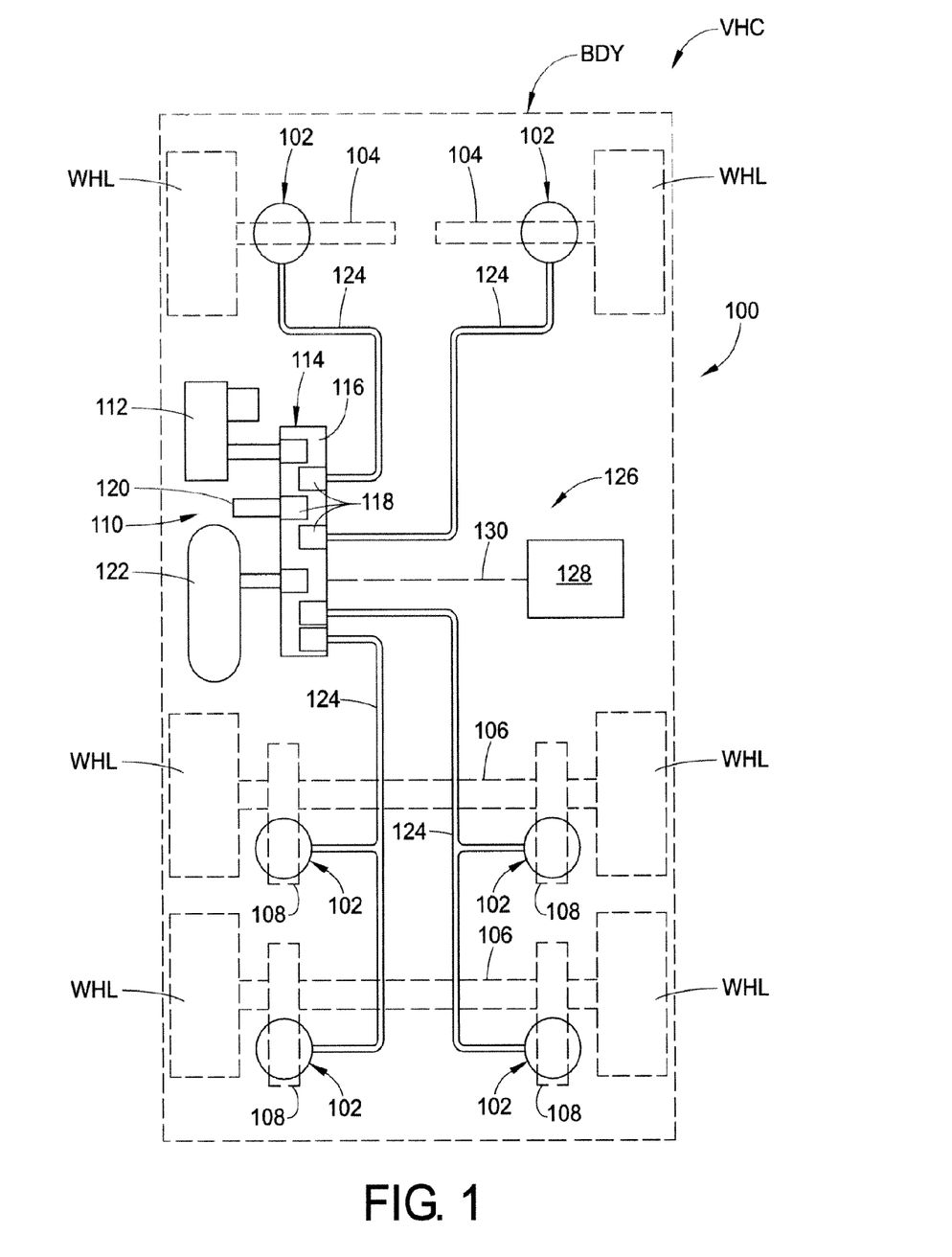
FIG. 1 is a schematic representation of one example of a vehicle including a suspension system and gas spring assemblies in accordance with the subject matter of the present disclosure.

Turning now to the drawings, wherein the showings are for the purpose of illustrating examples of the subject matter of the present disclosure and which are not intended as a limitation of the same, FIG. 1 illustrates one example of a suspension system 100 disposed between a sprung mass, such as an associated vehicle body BDY, for example, and an unsprung mass, such as an associated wheel WHL or an associated wheel-engaging member or axle, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies, one or more of which is disposed toward each corner of the associated vehicle adjacent a corresponding wheel WHL thereof. It will be appreciated, however, that any other suitable number of gas spring assemblies could alternately be used and/or that such gas spring assemblies can be disposed in any other suitable configuration and/or arrangement. In the exemplary arrangement schematically represented in FIG. 1, a plurality of gas spring assemblies 102 are operatively connected between the sprung and unsprung masses of the vehicle with two of gas spring assemblies 102 operatively associated with front wheel-engaging members 104 of vehicle VHC and the remaining gas spring assemblies operatively associated with rear wheel-engaging members 106 of vehicle VHC. In particular, rear wheel-engaging members 106 are shown as including trailing arms 108 that are operatively connected thereto with gas spring assemblies 102 operatively disposed between a trailing arm and the sprung mass (e.g., body BDY) of the vehicle. It will be appreciated, however, that other suitable arrangements and/or configurations could alternately be used.

Suspension system 100 can also optionally include a pressurized gas system 110 that is operatively associated with the gas spring assemblies for selectively supplying pressurized gas (e.g., air) thereto and selectively transferring pressurized gas therefrom. In the exemplary embodiment shown in FIG. 1, pressurized gas system 110 includes a pressurized gas source, such as a compressor 112, for example, for generating pressurized air or other gases. The pressurized gas system can also include any number of one or more control devices of any suitable type, kind and/or construction that may be capable of affecting the selective transfer of pressurized gas. For example, a valve assembly 114 is shown as being in communication with compressor 112 and can be of any suitable configuration or arrangement. In the exemplary embodiment shown, valve assembly 114 includes a valve block 116 with a plurality of valves 118 supported thereon. Valve assembly 114 can also optionally include a suitable exhaust, such as a muffler 120, for example, for venting pressurized gas from the system. Optionally, pressurized gas system 110 can also include a reservoir 122 in fluid communication with valve assembly 114 and suitable for storing pressurized gas.

The one or more control devices, such as valve assembly 114, for example, can be in communication with gas spring assemblies 102 in any suitable manner, such as, for example, through suitable gas transfer lines 124. As such, pressurized gas can be selectively transferred to and/or from the gas springs through valve assembly 114, such as to alter or maintain vehicle height at one or more corners of the vehicle, for example.

Suspension system 100 also includes a control system 126 that is capable of communication with any one or more other systems and/or components (not shown) of suspension system 100 and/or of vehicle VHC, and is capable of selective operation and control of the suspension system. Control system 126 includes a controller or electronic control unit (ECU) 128 in communication with one or more components of pressurized gas system 110 (e.g., compressor 112 and/or valve assembly 114), such as through a suitable conductor or lead 130, for example, for selective operation and control thereof, including supplying and exhausting pressurized gas to and from any number of one or more gas spring assemblies, such as gas spring assemblies 102, for example. Additionally, it will be appreciated that controller 128 can be of any suitable type, kind and/or configuration.

Control system 126 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors or non-contact sensors (e.g., ultrasonic wave sensors and electromagnetic wave sensors, such as may respectively operate using ultrasonic or electromagnetic waves), for example.

Having described an example of a suspension system (e.g., suspension system 100) that can include a gas spring assembly in accordance with the subject matter of the present disclosure, one example of such a gas spring assembly will now be described in connection with FIGS. 2 and 3. As shown therein, a gas spring assembly 200, such as may be suitable for use as a gas spring assembly 102 in FIG. 1, for example, is shown as including an end member, such as top or bead plate 202, for example, an end member, such as gas spring piston and pump assembly 204, for example, that is spaced from the other end member such that a longitudinal axis AX is at least partially formed therebetween. A flexible wall, such as a flexible sleeve 206, for example, is secured between the end members (e.g., bead plate 202 and assembly 204) and at least partially forms spring chamber 208 therebetween. Flexible sleeve 206 includes a mounting bead 210 and a mounting bead 212 formed along opposing ends of the flexible sleeve.

Mounting bead 210 of flexible sleeve 206 is shown as being captured by the peripheral edge (not numbered) of bead plate 202. It will be appreciated that the peripheral edge can be deformed around mounting bead 210 in any manner suitable for forming a substantially fluid-tight seal therewith. One or more securement devices, such as mounting studs 214, for example, can be included along bead plate 202. In the exemplary embodiment shown in FIGS. 2 and 3, mounting studs 214 project outwardly from the bead plate 202 are secured thereon in a suitable manner, such as, for example, by way of a flowed-material joint or a press-fit connection. Such one or more securement devices (e.g., mounting studs 214) may be suitable for securing bead plate 202 on an associated structural member, such as an upper structural component USC of a vehicle, for example. It will be appreciated that bead plate 202 can be secured to the associated structural member in any suitable manner. For example, upper structural component USC can include one or more mounting holes HLS extending therethrough. Mounting studs 214 can extend or otherwise be accessible through holes HLS and can be secured to the associated structural member in a suitable manner, such as by using one or more threaded nuts or other securement devices (not shown), for example. Additionally, a fluid communication port, such as a fluid passage 216, for example, can optionally be provided to permit fluid communication with spring chamber 208. In the exemplary embodiment shown, fluid passage 216 extends through at least one of studs 214 and is in fluid communication with spring chamber 208. However, it will be appreciated that any other suitable fluid communication arrangement could alternately be used.

Figure 2:
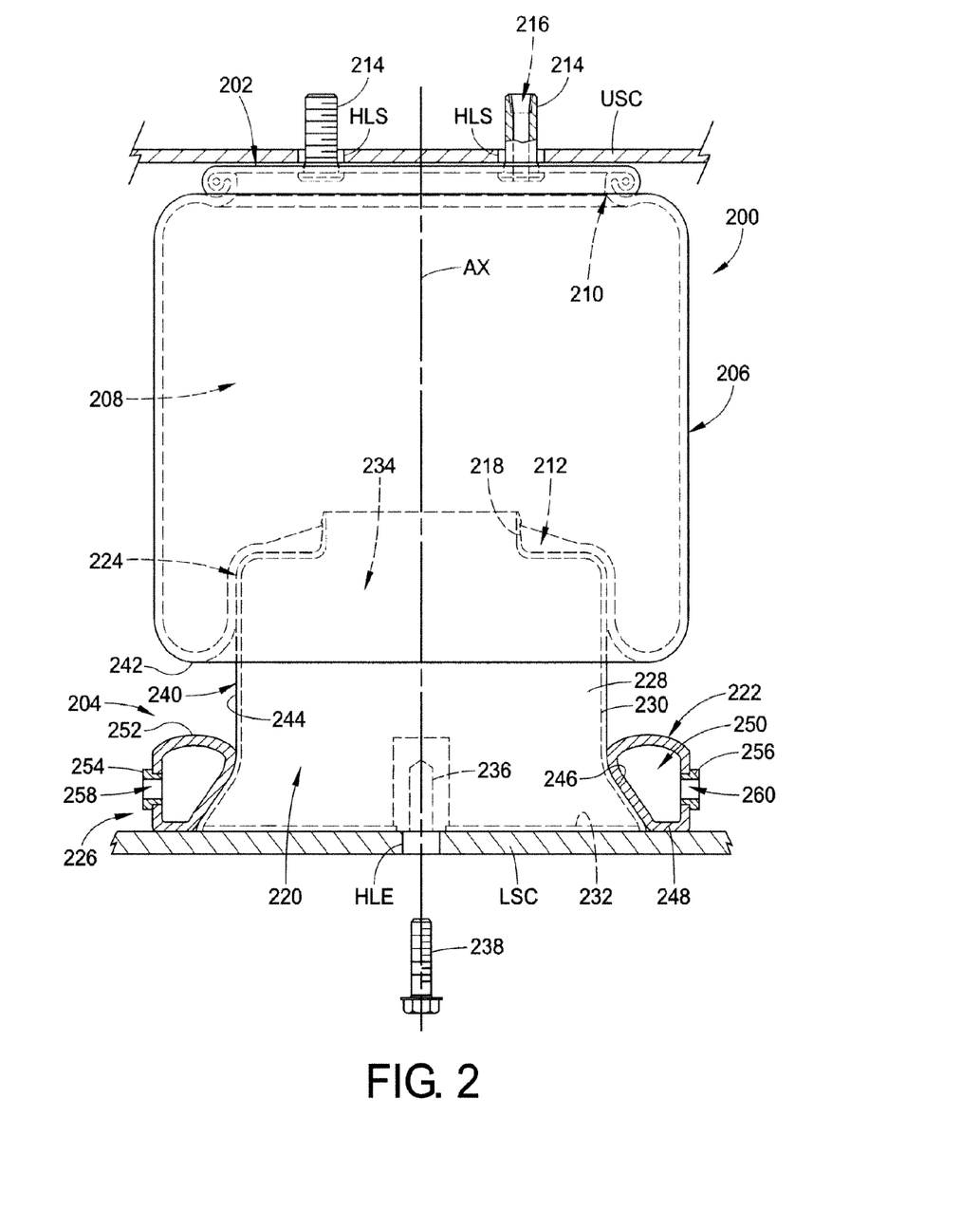
FIG. 2 is a side view of one example of a gas spring assembly including a gas spring piston and pump assembly in accordance with the subject matter of the present disclosure shown in a standard-usage height condition.
Figure 3:
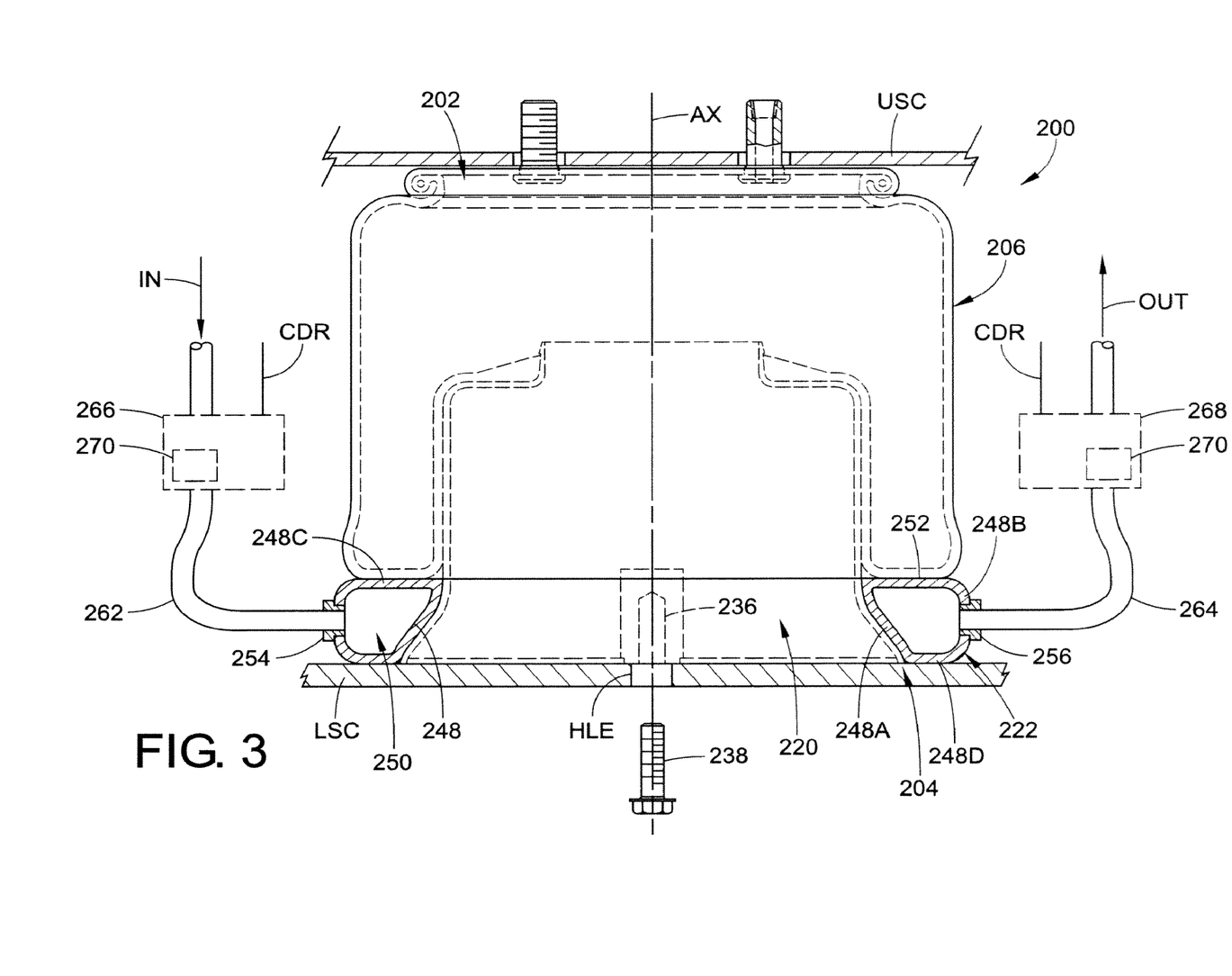
FIG. 3 is a side view of the exemplary gas spring assembly in FIG. 2 shown in a collapsed or jounce condition with the pump of the gas spring piston and pump assembly undergoing actuation.

Although not illustrated in FIGS. 2 and 3, the lower mounting bead of the flexible sleeve could be captured between an end closure and a suitable component and/or feature of the gas spring piston and pump assembly in a conventional manner, and the end closure could be secured on the piston using a suitable securement device or assembly, such as a mounting stud and nut, for example. Alternately, piston 204 can include a bead mounting wall 218 that is adapted to receive and retain mounting bead 212, such as is shown in FIGS. 2 and 3, for example.

Gas spring piston and pump assembly 204 is shown as including a gas spring piston 220 and a compressible bladder 222 that is disposed in operative association along the gas spring piston. Gas spring piston 220 is shown as extending generally longitudinally between opposing ends 224 and 226, and as being of a generally conventional construction that includes a piston body 228 formed from an outer shell 230 and a base plate 232. The base plate is received within and operatively connected in a substantially fluid-tight manner to the outer shell such that a closed end of the piston body is formed thereby. In the exemplary arrangement shown, outer shell 230 at least partially defines an optional piston chamber 234 that is shown as being in fluid communication with spring chamber 208 through an opening (not numbered) along end 224.

Gas spring piston 220 can also include a securement feature, device and/or component that is suitable for mounting or otherwise fastening one or more components of the gas spring piston and pump assembly on or along an associated structural member. In the exemplary arrangement shown in FIGS. 2 and 3, the securement feature, device and/or component takes the form of a mounting boss (not numbered) having a threaded passage 236 that is operatively connected to the piston body, such as along base wall 232, for example, and is accessible for receiving an corresponding securement device or component, such as a threaded fastener 238, for example. In this manner, one or more components of the gas spring piston and pump assembly can be secured on or along an associated structural member (e.g., wheel-engaging members 104, wheel-engaging members 106 and/or trailing arms 108), such as, for example, is represented in FIGS. 2 and 3 by lower structural component LSC, which is shown as including a hole HLE that is dimensioned to receive threaded fastener 238. Of course, other fastening arrangements could alternately be employed.

Piston body 228 of gas spring piston 220 includes a side wall 240 that extends generally longitudinally between first and second ends 224 and 226. In use, a portion of flexible sleeve 206 forms a rolling-lobe 242 that is displaced along side wall 240 as the gas spring undergoes changes in overall height, such as, for example, may be due to variations in load conditions applied thereto and/or road impact conditions (e.g., jounce conditions), as is well understood by those of skill in the art. It will be recognized that a wide variety of shapes, profiles and/or configurations can and have been used in forming the side wall of gas spring pistons. As such, it will be appreciated that the profile of side wall 240 is merely exemplary in that the same includes a first portion 244 having an approximately frustoconical or cylindrical shape and a second portion 246 having a somewhat curvilinear shape.

Compressible bladder 222 is operatively disposed along end 226 of gas spring piston 220 and can operate as a compressor or pump for generating a quantity of gas having an increased pressure level (e.g., a pressure level greater than an associated ambient atmospheric pressure level, a pressure level greater than a nominal pressure level of the gas spring assembly with which the compressible bladder is associated, and/or a pressure level greater than a nominal pressure level at which one or more components of the pressurized gas system operates). Additionally, or in the alternative, compressible bladder 222 can operate as a compressor or pump for transferring a quantity of gas from the compressible bladder to an associated component or device that may be fluidically connected thereto, such as spring chamber 208 of gas spring assembly 200, one of gas spring assemblies 102 and/or reservoir 122 in FIG. 1, for example. In some cases, the overall volume of pressurized gas stored and/or displaced during actuation of the compressible bladder may be relatively or comparatively small in relation to the volume of a reservoir or spring chamber, for example. However, it is anticipated that the relatively high frequency with which jounce actions are known to occur can have a cumulative effect and result in a significant volume of pressurized gas and/or a significant increase in pressure level being generated, transferred and/or stored as a result of the operation of a compressible bladder, such as compressible bladder 222, for example.

It will be appreciated that a compressible bladder in accordance with the subject matter of the present disclosure, such as compressible bladder 222, for example, can be of any suitable size, shape, configuration and/or arrangement and can be constructed in any suitable manner. In the exemplary arrangement shown in FIGS. 2 and 3, compressible bladder 222 is shown as including a flexible wall 248 that at least partially defines a bladder chamber 250 that is capable of storing a quantity of pressurized gas at an elevated pressure for an extended period of time, such as hours, days, weeks or months. In a preferred arrangement, the pressurized gas can be stored for such an extended period of time without a substantial reduction in the pressure level. In some cases, a loss of less than 50 percent of the gas pressure level may be acceptable. In other cases, however, a gas pressure loss of less than 25 percent and, more preferably, of less than 10 percent is preferred.

Additionally, a flexible wall of a compressible bladder in accordance with the subject matter of the present disclosure, such as flexible wall 248, for example, can include one or more wall portions that extend at least partially around or otherwise along a gas spring piston, such as, for example, by extending circumferentially about the gas spring piston through an angle within a range of from approximately 30 degrees to approximately 360 degrees. In a preferred arrangement, the flexible wall can extend peripherally about the piston body in an endless annular ring. It will be appreciated, however, that other arrangements could alternately be used.

Furthermore, a flexible wall of a compressible bladder in accordance with the subject matter of the present disclosure, such as flexible wall 248, for example, can include one or more wall portions, such as may be identifiable in cross-section, for example. In the arrangement shown in FIGS. 2 and 3, for example, flexible wall 248 includes an inner wall portion 248A disposed adjacent side wall 240, an outer wall portion 248B dispose radially-outwardly of the inner wall portion, an end wall portion 248C disposed toward flexible wall 206, and/or an end wall portion 248D disposed toward an associated structural component (e.g., lower structural component LSC), as are identified in FIG. 3.

Further still, a flexible wall of a compressible bladder in accordance with the subject matter of the present disclosure, such as flexible wall 248, for example, can be formed from any suitable material or combination of materials, such as thermoplastic elastomer (e.g., polyurethane), natural rubber and/or synthetic rubber, for example, and can optionally include one or more plies of fabric or fiber reinforcement.

As illustrated in FIGS. 2 and 3, a portion of flexible wall 248 can be disposed on or along a portion of side wall 240 of gas spring piston 220. Additionally, or in the alternative, a portion of flexible wall 248 can be disposed on or along another component or structure, such as along lower structural component LSC, for example. Additionally, a portion of the flexible wall can, optionally, be secured on or along either or both of such components (e.g., portion 246 of side wall 240) and/or structures (e.g., lower structural component LSC) in any suitable manner, such as by using an adhesive process, a flowed-material joint and/or one or more securement devices (e.g., fasteners).

During use, rolling lobe 242 will be displaced along side wall 240 as the gas spring assembly is extended and collapsed, such as during rebound and jounce conditions, for example, as have been respectively described above. As can be seen in FIG. 3, as the gas spring assembly moves toward a collapsed condition, rolling lobe 242 comes into contact with a surface or portion of the flexible wall, such as top surface 252, for example. As the gas spring assembly is further displaced into the collapsed condition, the flexible wall impinges against compressible bladder 222 causing the compressible bladder to undergo deflection, such as is illustrated in FIG. 3, for example. This deflection of the compressible bladder can cause the pressurized gas contained within bladder chamber 250 to increase in pressure. As the gas spring assembly returns from the collapsed or jounce condition toward a normal height (FIG. 2), the increased pressure within the compressible bladder will abate.

If, however, the increased pressure level within the compressible bladder can at least partially be communicated to an external component and/or system prior to the elevated pressure level reverting to the lower, normal pressure, it is believed that useful energy can be extracted from the normal operation of gas spring assemblies and used to reduce or offset the energy demand of features and/or operations of the vehicle suspension system, or other systems and/or components, such as the energy consumed by the action of generating pressurized gas using an electrically operated compressor (e.g., compressor 112), for example.

It will be appreciated that the increased pressure level within the compressible bladder can be fluidically communicated to an external component and/or system in any suitable manner. For example, compressible bladder 222 is shown as optionally including fittings 254 and 256 that are in fluid communication with bladder chamber 250 through passages 258 and 260, respectively, and can be used to permit the transfer of pressurized gas into and/or out of the compressible bladder.

FIG. 3 also includes schematic illustrations of optional gas transfer lines (e.g., pressurized gas hoses) 262 and 264 that are operatively connected to connector fittings 254 and 256 and in fluid communication with bladder chamber 250 through passages 258 and 260 (FIG. 2), respectively. In the exemplary arrangement shown in FIG. 3, gas transfer line 262, if provided, can transfer pressurized gas into bladder chamber 250, as is represented by reference arrow IN, such as may occur to resupply the bladder chamber with lower pressure gas (e.g., ambient air) after a charge or pump action has been performed. Gas transfer line 264, if provided, can transfer pressurized gas out of bladder chamber 250, as is represented in FIG. 3 by reference arrow OUT, such as to transfer a quantity of gas at an elevated pressure generated during a jounce condition of the gas spring assembly to an external component and/or system. Additionally, one or more control devices, such as valves 266 and/or 268, for example, can be optionally included to selectively control the transfer of pressurized gas into and/or out of bladder chamber 250.

Figure 4:
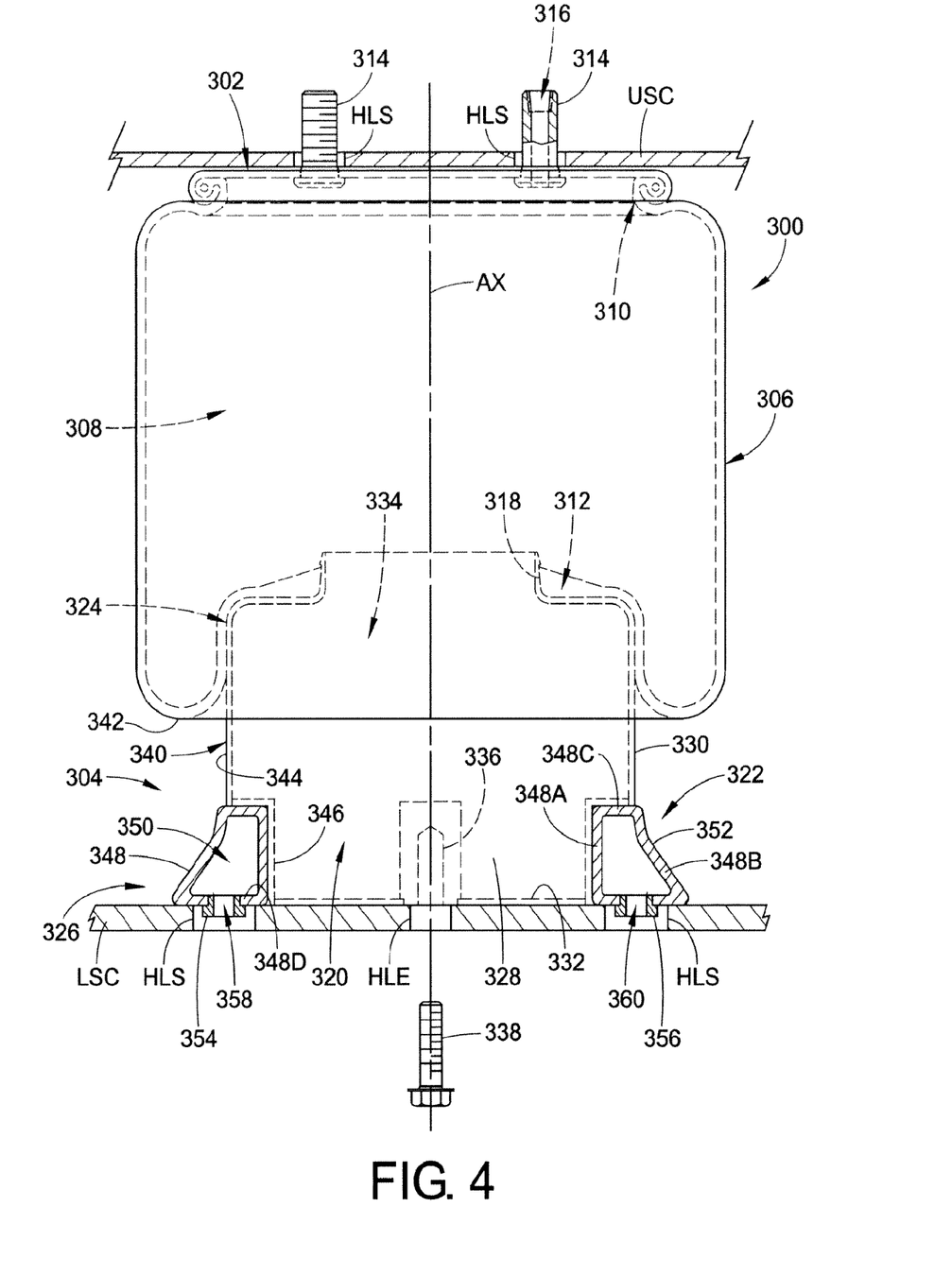
FIG. 4 is a side view of another example of a gas spring assembly including a gas spring piston and pump assembly in accordance with the subject matter of the present disclosure shown in a standard-usage height condition.
Figure 5:
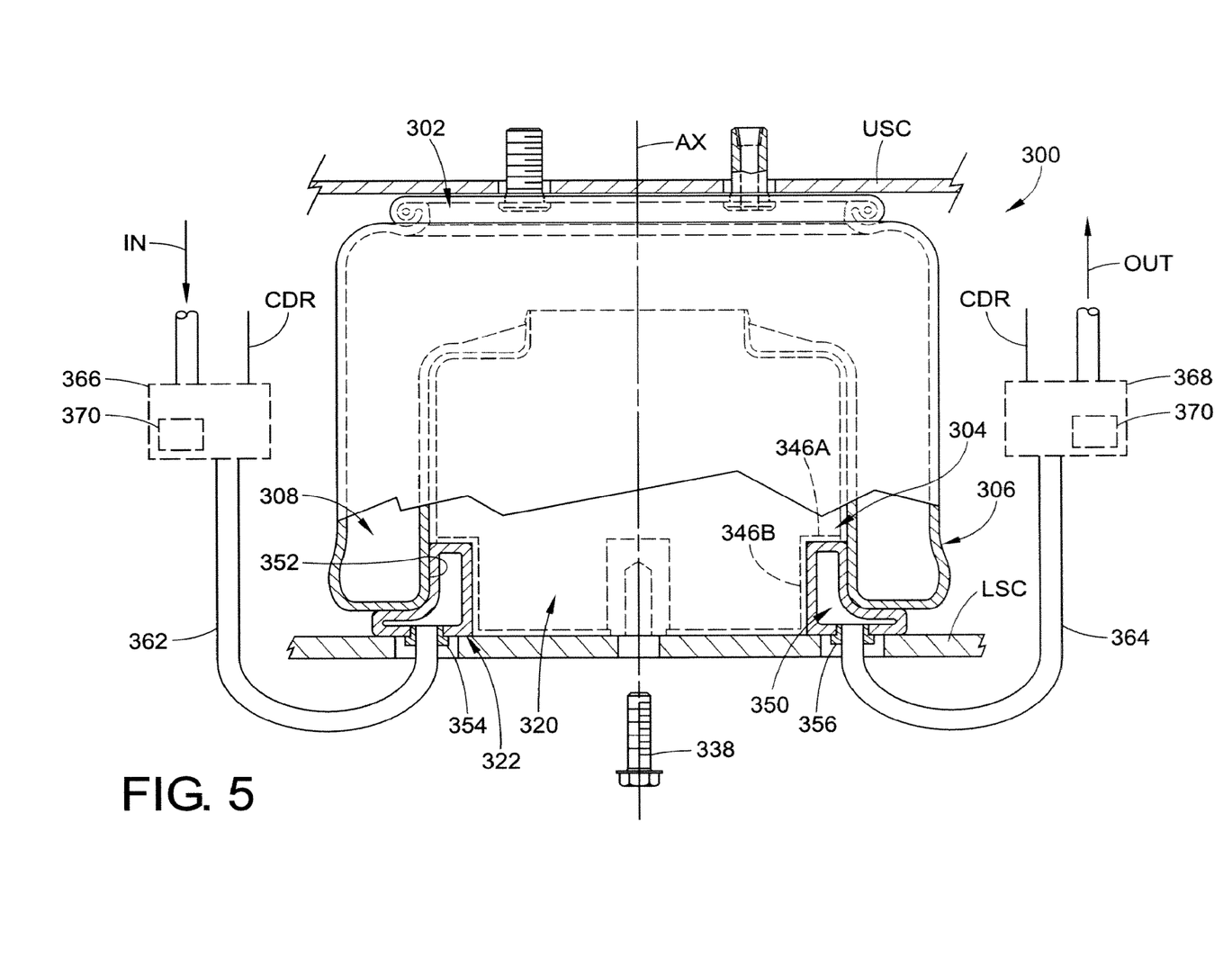
FIG. 5 is a side view of the exemplary gas spring assembly in FIG. 4 shown in a collapsed or jounce condition with the pump of the gas spring piston and pump assembly undergoing actuation.

Another example of a gas spring assembly 300, such as may be suitable for use as a gas spring assembly 102 in FIG. 1, for example, is shown in FIGS. 4 and 5 as including an end member, such as top or bead plate 302, for example, and an end member, such as gas spring piston and pump assembly 304, for example, that is spaced from the other end member such that a longitudinal axis AX is at least partially formed therebetween. A flexible wall, such as a flexible sleeve 306, for example, is secured between the end members (e.g., bead plate 302 and assembly 304) and at least partially forms a spring chamber 308 therebetween. Flexible sleeve 306 includes a mounting bead 310 and a mounting bead 312 formed along opposing ends of the flexible sleeve.

Mounting bead 310 of flexible sleeve 306 is shown as being captured by the peripheral edge (not numbered) of bead plate 302. It will be appreciated that the peripheral edge can be deformed around mounting bead 310 in any manner suitable for forming a substantially fluid-tight seal therewith. One or more securement devices, such as mounting studs 314, for example, can be included along bead plate 302. In the exemplary embodiment shown in FIGS. 4 and 5, mounting studs 314 project outwardly from the bead plate 302 are secured thereon in a suitable manner, such as, for example, by way of a flowed-material joint or a press-fit connection. Such one or more securement devices (e.g., mounting studs 314) may be suitable for securing bead plate 302 on an associated structural member, such as an upper structural component USC of a vehicle, for example. It will be appreciated that bead plate 302 can be secured on or along the associated structural component in any suitable manner. For example, upper structural component USC can include one or more mounting holes HLS extending therethrough. Mounting studs 314 can extend or otherwise be accessible through holes HLS and can be secured to the associated structural member in a suitable manner, such as by using one or more threaded nuts or other securement devices (not shown), for example. Additionally, a fluid communication port, such as a fluid passage 316, for example, can optionally be provided to permit fluid communication with spring chamber 308. In the exemplary embodiment shown, fluid passage 316 extends through at least one of studs 314 and is in fluid communication with spring chamber 308. However, it will be appreciated that any other suitable fluid communication arrangement could alternately be used.

Although not illustrated in FIGS. 4 and 5, the lower mounting bead of the flexible sleeve could be captured between an end closure and a suitable component and/or feature of the gas spring piston and pump assembly in a conventional manner, and the end closure could be secured on the piston using a suitable securement device or assembly, such as a mounting stud and nut, for example. Alternately, piston 304 can include a bead mounting wall 318 that is adapted to receive and retain mounting bead 312, such as is shown in FIGS. 4 and 5, for example.

Gas spring piston and pump assembly 304 is shown as including a gas spring piston 320 and a compressible bladder 322 that is disposed in operative association along the gas spring piston. Gas spring piston 320 is shown as extending generally longitudinally between opposing ends 324 and 326, and as being of a generally conventional construction that includes a piston body 328 formed from an outer shell 330 and a base plate 332. The base plate is received within and operatively connected in a substantially fluid-tight manner to the outer shell such that a closed end of the piston body is formed thereby. In the exemplary arrangement shown, outer shell 330 at least partially defines an optional piston chamber 334 that is shown as being in fluid communication with spring chamber 308 through an opening (not numbered) along end 324.

Gas spring piston 320 can also include a securement feature, device and/or component that is suitable for mounting or otherwise fastening one or more components of the gas spring piston and pump assembly on or along an associated structural member. In the exemplary arrangement shown in FIGS. 4 and 5, the securement feature, device and/or component takes the form of a mounting boss (not numbered) having a threaded passage 336 that is operatively connected to the piston body, such as along base wall 332, for example, and is accessible for receiving a corresponding securement device or component, such as a threaded fastener 338, for example. In this manner, one or more components of the gas spring piston and pump assembly can be secured on or along an associated structural member (e.g., wheel-engaging members 104, wheel-engaging members 106 and/or trailing arms 108), such as, for example, is represented in FIGS. 4 and 5 by lower structural component LSC, which is shown as including a hole HLE that is dimensioned to receive threaded fastener 338. Of course, other fastening arrangements could alternately be employed.

Piston body 328 of gas spring piston 320 includes a side wall 340 that extends generally longitudinally between first and second ends 324 and 326. In use, a portion of flexible sleeve 306 forms a rolling-lobe 342 that is displaced along side wall 340 as the gas spring undergoes changes in overall height, such as, for example, may be due to variations in load conditions applied thereto and/or road impact conditions (e.g., jounce conditions), as is well understood by those of skill in the art. It will be recognized that a wide variety of shapes, profiles and/or configurations can and have been used in forming the side wall of gas spring pistons. As such, it will be appreciated that the profile of side wall 340 is merely exemplary in that the same includes a first portion 344 having an approximately frustoconical or cylindrical shape. Side wall 340 of piston body 328 differs from side wall 240 of piston body 228 in that a second portion 346 of side wall 340 includes a shoulder wall section 346A (FIG. 5) and recess wall section 346B (FIG. 5) that together at least partially define a recess (not numbered) extending radially-inwardly into the piston body. It will be appreciated that the recess is preferably dimensioned to receive and retain at least a portion of compressible bladder 322. As such, shoulder wall section 346A is disposed in spaced relation to the portion (not identified) of base wall 332 that is in abutting engagement with lower structural component LSC in a direction toward end 324. And, recess wall section 346B is spaced radially inwardly from first portion 344 of side wall 340.

Compressible bladder 322 is operatively disposed along end 326 of gas spring piston 320 and can operate as a compressor or pump for generating a quantity of gas having an increased pressure level (e.g., a pressure level greater than an associated ambient atmospheric pressure level, a pressure level greater than a nominal pressure level of the gas spring assembly with which the compressible bladder is associated, and/or a pressure level greater than a nominal pressure level at which one or more components of the pressurized gas system operates). Additionally, or in the alternative, compressible bladder 322 can operate as a compressor or pump for transferring a quantity of gas from the compressible bladder to an associated component or device that may be fluidically connected thereto, such as spring chamber 308 of gas spring assembly 300, one of gas spring assemblies 102 and/or reservoir 122 in FIG. 1, for example. In some cases, the overall volume of pressurized gas stored and/or displaced during actuation of the compressible bladder may be relatively or comparatively small in relation to the volume of a reservoir or spring chamber, for example. However, it is anticipated that the relatively high frequency with which jounce actions are known to occur can have a cumulative effect and result in a significant volume of pressurized gas and/or a significant increase in pressure level being generated, transferred and/or stored as a result of the operation of a compressible bladder, such as compressible bladder 322, for example.

It will be appreciated that a compressible bladder in accordance with the subject matter of the present disclosure, such as compressible bladder 322, for example, can be of any suitable size, shape, configuration and/or arrangement and can be constructed in any suitable manner. In the exemplary arrangement shown in FIGS. 4 and 5, compressible bladder 322 is shown as including a flexible wall 348 that at least partially defines a bladder chamber 350 that is capable of storing a quantity of pressurized gas at an elevated pressure for an extended period of time, such as hours, days, weeks or months. In a preferred arrangement, the pressurized gas can be stored for such an extended period of time without a substantial reduction in the pressure level. In some cases, a loss of less than 50 percent of the gas pressure level may be acceptable. In other cases, however, a gas pressure loss of less than 25 percent and, more preferably, of less than 10 percent is preferred.

Additionally, a flexible wall of a compressible bladder in accordance with the subject matter of the present disclosure, such as flexible wall 348, for example, can include one or more wall portions that extend at least partially around or otherwise along a gas spring piston, such as, for example, by extending circumferentially about the gas spring piston through an angle within a range of from approximately 30 degrees to approximately 360 degrees. In a preferred arrangement, the flexible wall can extend peripherally about the piston body in an endless annular ring. It will be appreciated, however, that other arrangements could alternately be used.

Furthermore, a flexible wall of a compressible bladder in accordance with the subject matter of the present disclosure, such as flexible wall 348, for example, can include one or more wall portions, such as may be identifiable in cross-section, for example. In the arrangement shown in FIGS. 4 and 5, for example, flexible wall 348 includes an inner wall portion 348A disposed adjacent side wall 340, an outer wall portion 348B dispose radially-outwardly of the inner wall portion, an end wall portion 348C disposed toward flexible wall 306, and/or an end wall portion 348D disposed toward an associated structural component (e.g., lower structural component LSC), as are identified in FIG. 4.

Further still, a flexible wall of a compressible bladder in accordance with the subject matter of the present disclosure, such as flexible wall 348, for example, can be formed from any suitable material or combination of materials, such as thermoplastic elastomer (e.g., polyurethane), natural rubber and/or synthetic rubber, for example, and can optionally include one or more plies of fabric or fiber reinforcement.

As illustrated in FIGS. 4 and 5, a portion of flexible wall 348 can be at least partially disposed within the recess formed along side wall 340 of gas spring piston 320. Additionally, or in the alternative, a portion of flexible wall 348 can be disposed on or along another component or structure, such as along lower structural component LSC, for example. Additionally, a portion of the flexible wall can, optionally, be secured on or along either or both of such components (e.g., portion 346 of side wall 340) and/or structures (e.g., lower structural component LSC) in any suitable manner, such as by using an adhesive process, a flowed-material joint and/or one or more securement devices (e.g., fasteners).

During use, rolling lobe 342 will be displaced along side wall 340 as the gas spring assembly is extended and collapsed, such as during rebound and jounce conditions, for example, as have been respectively described above. As can be seen in FIG. 5, as the gas spring assembly moves toward a collapsed condition, rolling lobe 342 comes into contact with a surface or portion of the flexible wall, such as outer side surface 352, for example. As the gas spring assembly is further displaced into the collapsed condition, the flexible wall impinges against compressible bladder 322 causing the compressible bladder to undergo deflection, such as is illustrated in FIG. 5, for example. This deflection of the compressible bladder can cause the pressurized gas contained within bladder chamber 350 to increase in pressure. As the gas spring assembly returns from the collapsed or jounce condition toward a normal height (FIG. 4), the increased pressure within the compressible bladder will abate.

If, however, the increased pressure level within the compressible bladder can at least partially be communicated to an external component and/or system prior to the elevated pressure level reverting to the lower, normal pressure, it is believed that useful energy can be extracted from the normal operation of gas spring assemblies and used to reduce or offset the energy demand of features and/or operations of the vehicle suspension system, or other systems and/or components, such as the energy consumed by the action of generating pressurized gas using an electrically operated compressor (e.g., compressor 112), for example.

It will be appreciated that the increased pressure level within the compressible bladder can be fluidically communicated to an external component and/or system in any suitable manner. For example, compressible bladder 322 is shown as optionally including fittings 354 and 356 that are in fluid communication with bladder chamber 350 through passages 358 and 360, respectively, and can be used to permit the transfer of pressurized gas into and/or out of the compressible bladder.

FIG. 5 also includes schematic illustrations of optional gas transfer lines (e.g., pressurized gas hoses) 362 and 364 that are operatively connected to connector fittings 354 and 356 and in fluid communication with bladder chamber 350 through passages 358 and 360 (FIG. 4), respectively. Connector fittings 354 and 356 can be accessed in any suitable manner, such as through holes HLS (FIG. 4) in lower structural component LSC, for example. In the exemplary arrangement shown in FIG. 5, gas transfer line 362, if provided, can transfer pressurized gas into bladder chamber 350, as is represented by reference arrow IN, such as may occur to resupply the bladder chamber with lower pressure gas (e.g., ambient air) after a charge or pump action has been performed. Gas transfer line 364, if provided, can transfer pressurized gas out of bladder chamber 350, as is represented in FIG. 5 by reference arrow OUT, such as to transfer a quantity of gas at an elevated pressure generated during a jounce condition of the gas spring assembly to an external component and/or system. Additionally, one or more control devices, such as valves 366 and/or 368, for example, can be optionally included to selectively control the transfer of pressurized gas into and/or out of bladder chamber 350.

It will be appreciated that the one or more control devices discussed above in connection with FIGS. 2-5 (e.g., one or more of control devices 266, 268, 366 and/or 368), if included, can be operatively controlled in any suitable manner. As one example, one or more control devices (e.g., one or more of control devices 266, 268, 366 and/or 368) can take the form of a spring-actuated, one-way check valve that permits pressurized gas flow through the valve under conditions in which a predetermined differential pressure exists on fluidically-opposing sides of the valve. In such case, the one or more control valves can be selectively configured to operate substantially automatically as pressurized gas conditions vary with the performance of the gas spring piston and pump assembly.

As another example, one or more of the control devices (e.g., one or more of control devices 266, 268, 366 and/or 368) can be electrically actuated. In such case, it will be appreciated that such electrical actuation can be selectively performed in any suitable manner. For example, one or more of the control devices (e.g., one or more of control devices 266, 268, 366 and/or 368) can be communicatively coupled with an electronic control unit, such as ECU 128 of control system 126 in FIG. 1, for example. In FIGS. 3 and 5, control devices 266, 268, 366 and 368 are respectively shown as including a conductor or lead CDR that can be electrically connected or otherwise communicatively coupled with ECU 128 (FIG. 1) such that the one or more control devices can be selectively operated by the ECU in a suitable manner and in accordance with one or more predetermined conditions and/or characteristics, such as may correspond to signals, data and/or other output from one or more sensors or sensing devices (e.g., accelerometers, temperature sensors, pressure sensors, position sensors). One example of such a condition can relate to the gas pressure at or near one or more of the control devices. In such case, one or more of the control devices (e.g., one or more of control devices 266, 268, 366 and/or 368) can optionally include a pressure sensor 270 and 370, as are respectively shown in FIGS. 3 and 5. Pressure sensors 270 and/or 370, if provided, can be in electrical communication or otherwise communicatively coupled with ECU 128 (FIG. 1) to provide signals, data and/or other pressure-related output to the ECU for use in determine conditions appropriate for actuation (i.e., opening or closing) of a control device, such as one or more of control devices 266, 268, 366 and/or 368, for example.

As the gas spring travels into jounce, it encounters, and compresses, the toroidal-shaped bladder that extends peripherally about the gas spring piston. This bladder, when compresses, can act as a pump to incrementally increase the pressure within a reservoir or other storage chamber. The pressurized reservoir can be used to re-fill an empty air spring instead of using work from a compressor. As shown in FIGS. 4 and 5, for example, the bladder or "pump" could be energized more by hoop stress and the inward pressure of the rolling bellow, rather than the impact at jounce, as shown in FIGS. 2 and 3. This would be expected to result in less "bump-through" of the gas spring assembly and may provide improved performance characteristics (e.g., ride quality).

It will be appreciated that the gas spring assemblies of the present disclosure can be operatively connected between the sprung and unsprung masses of an associated vehicle in any suitable manner. For example, as shown in FIG. 1 the gas spring assemblies can be operatively connected between wheel-engaging members and a body of a vehicle VHC. It will be appreciated, however, that the configuration of vehicle VHC in FIG. 1 is merely a schematic representation of the structural components of the sprung and unsprung masses of the vehicle. Thus, it will be understood that this schematic representation is provided for purposes of discussion and ease of understanding and is not intended to be in any way limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alteration.

The invention claimed is:

1. A gas spring assembly comprising:
a first flexible wall extending peripherally about a longitudinal axis and between a first end and a second end spaced longitudinally from said first end;
an end member secured across said first end of said first flexible wall and forming a substantially fluid-tight seal therewith;
a gas spring piston extending longitudinally between opposing first and second piston ends, said gas spring piston including an outer side wall extending longitudinally from along said first piston end toward said second piston end, said second end of said first flexible wall secured across said first piston end of said gas spring piston and forming a substantially fluid-tight seal therewith such that a spring chamber is at least partially defined by said first flexible wall between said end member and said gas spring piston, said outer side wall including an outside surface with said first flexible wall disposed in abutting engagement along at least a portion of said outside surface of said outer side wall of said gas spring piston such that said first flexible wall forms a rolling lobe displaceable along said outside surface; and, a compressible bladder including a second flexible wall extending at least partially around said gas spring piston and at least partially defining a bladder chamber that is fluidically isolated from said spring chamber, said second flexible wall disposed along said gas spring piston in spaced relation to said first piston end in a direction toward said second piston end such that at least a portion of said outside surface is exposed for abutting engagement with said first flexible wall;

said gas spring assembly displaceable between a first condition in which said firs flexible wall is disposed in spaced relation to said compressible bladder and a second condition in which at least a portion of said first flexible wall compressively engages said second flexible wall.

2. A gas spring assembly according to claim 1 further comprising a pressure sensor disposed in fluid communication with a quantity of gas within said compressible bladder.

3. A gas spring assembly according to claim 1, wherein in said first condition said compressible bladder contains a quantity of pressurized gas having a first pressure level, and in said second condition at least a portion of said quantity of pressurized gas is increased to a second level.

4. A gas spring assembly according to claim 3, wherein said second flexible wall includes a passage extending therethrough such that at least a portion of said quantity of pressurized gas at said first pressure level can be transferred into said bladder chamber through said passage.

5. A gas spring assembly according to claim 4, wherein said passage is a first passage, and second flexible wall includes a second passage extending therethrough such that at least a portion of said quantity of pressurized gas at said second pressure level that is greater than said first pressure level can be transferred out of said bladder chamber through said second passage.

6. A gas spring assembly according to claim 5 further comprising a control device in fluid communication with at least one of said bladder chamber, said first passage and said second passage and operative to selectively control transmission of at least one of pressurized gas at said first pressure level into said bladder chamber through said first passage and pressurized gas at said second pressure level out of said bladder chamber through said second passage.

7. A gas spring assembly according to claim 6, wherein said control device is a first control device operative to selectively control transmission of pressurized gas at said first pressure level into said bladder chamber through said first passage, and said gas spring assembly further comprises a second control device in fluid communication with at least one of said bladder chamber, said first passage and said second passage and operative to selectively control transmission of pressurized gas at said second pressure level out of said bladder chamber through said second passage.

8. A gas spring assembly according to claim 1, wherein said gas spring piston includes a recess extending radially inwardly into said gas spring piston from along said outer side wall and at least a portion of said compressible bladder is received within said recess.

9. A suspension system comprising:
a pressurized gas source;
at least one gas spring assembly including:
a first flexible wall extending peripherally about a longitudinal axis and between a first end and a second end spaced longitudinally from said first end;
an end member secured across said first end of said first flexible wall and forming a substantially fluid-tight seal therewith;
a gas spring piston extending longitudinally between opposing first and second piston ends, said gas spring piston including an outer side wall extending longitudinally from along said first piston end toward said second piston end, said second end of said first flexible wall secured across said first piston end of said gas spring piston and forming a substantially fluid-tight seal therewith such that a spring chamber is at least partially defined by said first flexible wall between said end member and said gas spring piston, said outer side wall including an outside surface with said first flexible wall disposed in abutting engagement along at least a portion of said outside surface of said outer side wall of said gas spring piston such that said first flexible wall forms a rolling lobe displaceable along said outside surface; and,
a compressible bladder including a second flexible wall extending at least partially around said gas spring piston and at least partially defining a bladder chamber that is fluidically isolated from said spring chamber, said second flexible wall disposed along said gas spring piston in spaced relation to said first piston end in a direction toward said second piston end such that at least a portion of said outside surface is exposed for abutting engagement with said first flexible wall;
said gas spring assembly displaceable between a first condition in which said first flexible wall is disposed in spaced relation to said compressible bladder and a second condition in which at least a portion of said first flexible wall compressively engages said second flexible wall; and,
a valve assembly fluidically connected between said pressurized gas source and said at least one gas spring assembly.

10. A suspension system according to claim 9, wherein said compressible bladder includes first and second passages extending through said second flexible wall such that gas can be transferred into and out of said bladder chamber through one or more of said first and second passages;
said suspension system further comprising:
a first control device in fluid communication with said bladder chamber through said first passage; and,
a second control device in fluid communication with said bladder chamber through said second passage;
in said first condition of said gas spring assembly, said compressible bladder containing a quantity of pressurized gas having a first pressure level with said first control device operative to selectively control transmission of pressurized gas at approximately said first pressure level into said bladder chamber through said first passage; and,
in said second condition, at least a portion of said quantity of pressurized gas being increased to a second pressure level with said second control device operative to selectively control transmission of pressurized gas at said second pressure level out of said bladder chamber through said second passage.

11. A suspension system according to claim 10 further comprising a control system communicatively coupled to at least one of said pressurized gas source, said first control device and said second control device, and operative to selectively actuate said at least one thereof.

12. A suspension system according to claim 11, wherein said gas spring assembly includes a pressure sensor disposed in fluid communication with a quantity of gas within said compressible bladder, and said control system is communicatively coupled with said pressure sensor and selectively actuates at least one of said pressurized gas source, said first control device and said second control device based on an output from said pressure sensor.

13. An assembly dimensioned for use with an associated flexible wall, said assembly comprising:
- a gas spring piston extending longitudinally between opposing first and second piston ends, said gas spring piston including an outer side wall extending longitudinally from along said first piston end toward said second piston end, said first piston end dimensioned to receivingly engage an associated end of the associated flexible wall, and said outer side wall including an outside surface dimensioned to abuttingly engage the associated flexible wall; and,
- a compressible bladder extending at least partially around said gas spring piston and at least partially defining a bladder chamber, said compressible bladder disposed along said gas spring piston in spaced relation to said first piston end in a direction toward said second piston end such that at least a portion of said outside surface of said outer side wall of said gas spring piston is outwardly exposed adjacent said first piston end;
- said outwardly exposed portion of said outside surface of said outer side wall having a length sufficient for the associated flexible wall to form an associated rolling lobe displaceable in abutting engagement therealong and such that at least a portion of the associated flexible wall can compressively engage said compressible bladder and generate an increased pressure level of a quantity of gas within said bladder chamber.

14. An assembly according to claim 13, wherein said compressible bladder includes a flexible wall having an inner wall portion disposed in abutting engagement along said outer side wall of said gas spring piston.

15. An assembly according to claim 14, wherein said inner wall portion is secured along said outer side wall of said gas spring piston.

16. An assembly according to claim 13, wherein said gas spring piston includes a recess extending radially inwardly into said gas spring piston from along said outer side wall and at least a portion of said compressible bladder is received within said recess.

17. An assembly according to claim 13, wherein said compressible bladder includes a first passage extending therethrough such that at least a portion of said quantity of gas at an initial pressure level can be transferred into said bladder chamber.

18. An assembly according to claim 17 further comprising a first connector fitting secured along said compressible bladder in fluid communication with said first passage.

19. An assembly according to claim 17, wherein said compressible bladder includes a second passage extending therethrough such that said quantity of gas at said increased pressure level that is greater than said initial pressure level can be transferred out of said bladder chamber.

20. An assembly according to claim 19 further comprising a second connector fitting secured along said compressible bladder in fluid communication with said second passage.

* * * * *